United States Patent Office.

JOHN BENDER, OF LONACONING, MARYLAND.

Letters Patent No. 77,245, dated April 28, 1868.

IMPROVED BITTERS.

*The Schedule referred to in these Letters Patent and making part of the same.*

TO ALL WHOM IT MAY CONCERN:

Be it known that I, JOHN BENDER, of Lonaconing, in the county of Alleghany, and State of Maryland, have invented a new and improved Medical Compound; and I do hereby declare that the following is a full, clear, and exact description thereof, which will enable those skilled in the art to make and use the same.

This invention and discovery have reference to a composition formed of various ingredients known to the medical faculty, and which composition or compound is intended as a "tonic elixir," or cure for certain diseases, as dyspepsia, and diseases of the stomach and bowels, as well as for other bodily ills.

And the invention and discovery consist in combining the ingredients hereinafter named by any of the methods with which members of the medical profession are familiar.

R. Pulvises aloes, (Soc.,) $\mathfrak{z}$ i 3 j c.

Zedoariæ rad.,
Gentianæ,
Serpentariæ,
Croci,
Rhei,
Agarici, (alb.,) $\Big\} a^1 a^1 \mathfrak{z}$ j c.
Gum Allyrrhæ,
Alpinial Galanga rad., (cardamomi,)
Confect. opii Thuviacæ,
Alcoholis, Aquæ, ā ā, o j c.

Having thus described my invention, I claim as new, and desire to secure by Letters Patent—

A medical compound or composition, formed by combining the above-mentioned ingredients, substantially as described.

The above specification of my invention signed by me, this 15th day of February, 1868.

JOHN BENDER.

Witnesses:
HENRY HANEKAMP,
JACOB FRESH.